United States Patent [19]

Wickersheim et al.

[11] Patent Number: 4,859,079
[45] Date of Patent: Aug. 22, 1989

[54] OPTICAL SYSTEM USING A LUMINESCENT MATERIAL SENSOR FOR MEASURING VERY HIGH TEMPERATURES

[75] Inventors: Kenneth A. Wickersheim, Menlo Park; Mei H. Sun, Los Altos, both of Calif.

[73] Assignee: Luxtron Corporation, Mountain View, Calif.

[21] Appl. No.: 228,958

[22] Filed: Aug. 4, 1988

[51] Int. Cl.⁴ .......................... G01J 5/08; G01K 11/20
[52] U.S. Cl. ...................................... 374/131; 374/161
[58] Field of Search ............... 374/131, 161, 130, 139; 356/44; 250/342

[56] References Cited

U.S. PATENT DOCUMENTS

| Re. 31,832 | 2/1985 | Samulski | 374/131 |
|---|---|---|---|
| 3,639,765 | 2/1972 | Kleinerman | 250/83.3 H |
| 4,016,761 | 4/1977 | Rozell | 374/131 |
| 4,075,493 | 2/1978 | Wickersheim | 250/461 R |
| 4,136,566 | 1/1979 | Christensen | 374/131 |
| 4,140,393 | 2/1979 | Cetas | 356/43 |
| 4,215,275 | 7/1980 | Wickersheim | 250/459 |
| 4,448,547 | 5/1984 | Wickersheim | 374/131 |
| 4,560,286 | 12/1985 | Wickersheim | 374/131 |
| 4,576,486 | 3/1986 | Dils | 374/131 |
| 4,647,222 | 3/1987 | Schultheiss | 374/139 |
| 4,652,143 | 3/1987 | Wickersheim | 374/161 |
| 4,678,904 | 7/1987 | Saaski et al. | 250/227 |
| 4,679,934 | 7/1987 | Ganguly et al. | 356/43 |
| 4,708,494 | 11/1987 | Kleinerman | 374/161 |

FOREIGN PATENT DOCUMENTS

| 161629 | 10/1982 | Japan | 374/161 |
|---|---|---|---|
| 48850 | 10/1986 | Japan . | |
| 2045921 | of 1979 | United Kingdom | 374/131 |

OTHER PUBLICATIONS

Product announcement, "Conax Buffalo Developing an Optical Fiber Temperature Sensor", Apr., 1988.
Dakin et al., Letter in *Optical and Quantum Electronics*, 9, 1977, pp. 540–544.
Holmes, "Fiber Optic Probe for Thermal Profiling of Liquids during Crystal Growth", *Rev. Sci. Instrum.*, 50(5) May 1979, pp. 662–663.
Dils, "High-Temperature Optical Fiber Thermometer", *J. Appl. Phys.*, 54 (3), Mar. 1983, pp. 1198–1201.
Cooper, "Optical Fiber Thermometry: Quest for Precision", *Photonics Spectra*, Nov. 1985, pp. 71–76.
Dils et al., "Measurement of the Silver Freezing Point with an Optical Fiber Thermometer: Proof of Concept", *J. Appl. Phys.* 59 (4), 15 Feb. 1986, pp. 1005–1012.
Amick, "Optical Fiber Sensors Broaden Temperature Measurement Limits", *Research & Development*, Aug. 1986, pp. 64–66.

*Primary Examiner*—William A. Cuchlinski, Jr.
*Assistant Examiner*—W. Morris Worth
*Attorney, Agent, or Firm*—Majestic, Parsons, Siebert & Hsue

[57] ABSTRACT

A technique of measuring very high temperatures by positioning a blackbody sensor in thermal communication with an environment or object whose temperature is to be measured, communicating infrared emissions having an energy level proportional to such temperature from the sensor to an infrared absorber positioned a distance away from the sensor where the ambient temperature is significantly reduced, and then optically measuring the temperature of the absorber by a technique that uses visible or near visible optical radiation, such as one using a luminescent sensor. The measured temperature of the absorber is proportional to that of the blackbody sensor.

14 Claims, 2 Drawing Sheets

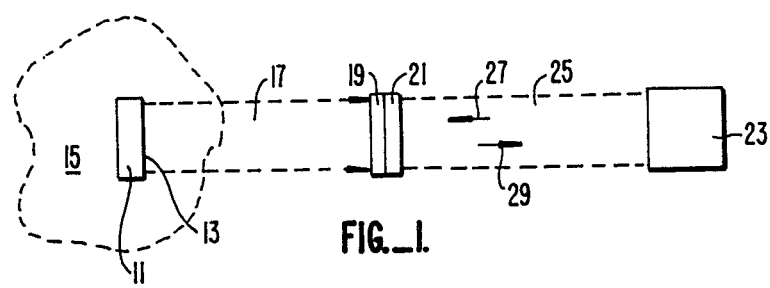
FIG._1.
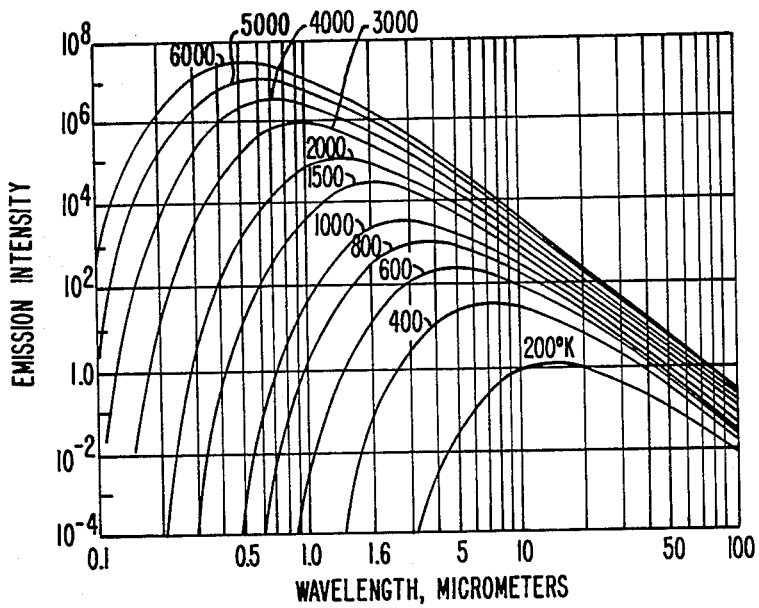
FIG._2.
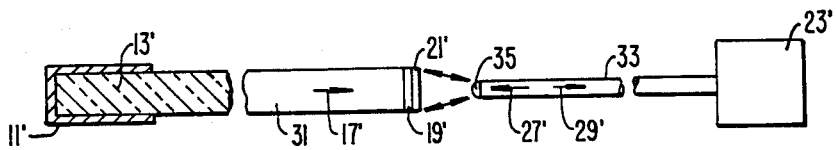
FIG._3.

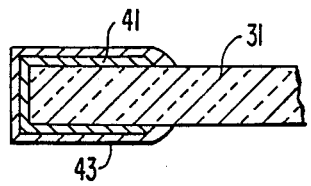
FIG._4A.
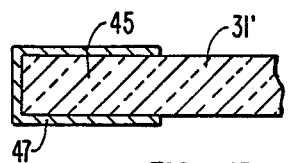
FIG._4B.
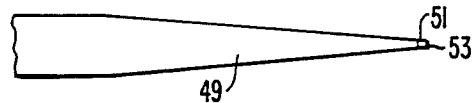
FIG._5.
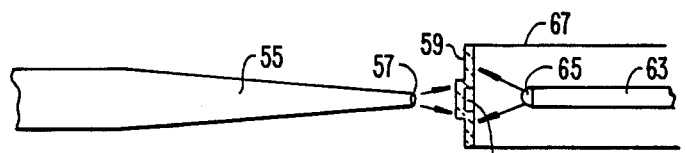
FIG._6.
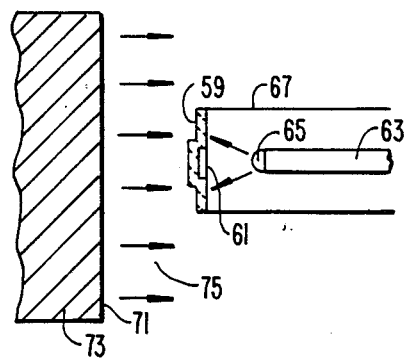
FIG._7.

OPTICAL SYSTEM USING A LUMINESCENT MATERIAL SENSOR FOR MEASURING VERY HIGH TEMPERATURES

BACKGROUND OF THE INVENTION

This invention is related generally to the measurement of temperature by optical techniques, and specifically to the measurement of very hot environments, such as those in excess of 450 degrees centigrade, using optical temperature sensors attached to optical fibers.

As an alternative to the use of metallic temperature sensors, such as thermocouples or thermistors, in environments not suitable for their use, optical fiber temperature sensors are being commercialized in various forms. Such sensors are typically formed from a temperature sensitive optical material or structure carried at end of an optical fiber transmission medium. Located at the other end of the fiber medium is an electro-optical instrument which directs radiation to the optical sensor, and which receives back and detects returning radiation which has been modified in a way relating to the temperature of the sensor's environment. The temperature dependent characteristics of the returning radiation are then measured by the instrument and converted to the reading of the temperature of the optical sensor.

Many different types of such optical temperature sensors have been proposed in the literature, some of which have found commercial application. One class of sensors simply reflects or absorbs light as a function of its temperature, so that the proportion of the light intensity sent by the instrument which is then returned to the instrument is proportional to temperature. Examples are given in U.S. Pat. Nos. 4,016,761 - Rozell (1977) and 4,136,566 - Christensen (1979). Another type of sensor, exemplified by U.S. Pat. No. 4,140,393 - Cetas (1979), uses a birefringent crystal which alters the polarization of incident light as a function of its temperature. Yet another type of sensor is an optical etalon, as in U.S. Pat. No. 4,678,904 - Saaski et al. (1987).

The most development has gone into sensors made of luminescent materials. The instrument sends optical radiation in one wavelength range along the optical fiber to the sensor in order to excite the sensor material to luminesce in another wavelength range. A characteristic of the returned luminescent radiation that is temperature dependent is then detected as a measure of the sensor's temperature. In one implementation, a ratio of the intensity of the luminescence in different wavelength bands is taken, the ratio being proportional to the sensor's temperature. This implementation and use of luminescent fiber optic sensors generally are described in U.S. Pat. Nos. 4,075,493 - Wickersheim (1978), 4,215,275 - Wickersheim (1980), 4,448,547 - Wickersheim (1984) and 4,560,286 - Wickersheim (1985). In another implementation, the luminescent sensor is repetitively pulsed with exciting radiation and then the rate of decay of the luminescent intensity between pulses is determined as a measure of temperature. This is the implementation that is being most widely commercialized, examples of which are given in U.S. Pat. Nos. Re. 31,832 - Samulski (1985) and 4,652,143 - Wickersheim et al. (1987).

There are many advantages of fiberoptic temperature measuring systems but they do have a limitation as to the maximum temperature at which they can operate. For example, commercial luminescent sensors are presently only available for measuring temperatures up to 450 degrees centigrade. With selected materials, higher temperatures could be measured, but only over a limited range. However, there are many applications where point temperature measurements substantially above 450 degrees centigrade are desirable or necessary. Presently available fiberoptic sensors, generally, cannot measure such temperatures for any one of several reasons. One such reason is that the temperature dependent characteristic of the sensor material may become difficult or impossible to measure at very high temperatures. Another reason is that most optical fibers and many optical sensor materials cannot operate at high temperatures because of undesirable sensor or fiber changes which occur in such a severe thermal environment.

One attempt at overcoming these difficulties is to substitute a small blackbody for the optical sensor and communicate its infrared emission along a crystalline rod or optical fiber that transmits reasonable amounts of infrared radiation and can withstand the high temperatures involved. At a distance from the hot environment or object being measured, where the temperature is substantially lower, the infrared-transmitting rod or fiber is connected to a standard low temperature optical fiber to communicate the infrared radiation from the blackbody to a detecting station. The intensity of the detected infrared radiation is proportional to the temperature of the blackbody sensor. Examples of such a sensor and system are given in U.S. Pat. Nos. 4,576,486 - Dils (1986) and 4,679,934 - Ganguly et al. (1987), and in a paper by Holmes, "Fiber Optic Probe for Thermal Profiling of Liquids During Crystal Growth," *Rev. Sci. Instrum.* 50(5), May 1979, pages 662–3.

These systems suffer from a limitation of conventional optical fibers with regard to their poor transmission of infrared radiation. Electromagnetic radiation in the infrared region of the spectrum is significantly attenuated by such fibers. Only the shortest wavelength (near-visible) infrared radiation from such blackbody sensors can be transmitted via such optical fibers. Until better infrared transmitting fibers are developed for use in such applications at a reasonable cost and with acceptable thermal and mechanical properties, this will remain a significant limitation of such systems.

Therefore, it is a primary object of the present invention to provide a high temperature measuring system utilizing an infrared radiating sensor and conventional optical fibers that overcome these disadvantages.

SUMMARY OF THE INVENTION

Accordingly, these and other objects are accomplished by the various aspects of the present invention wherein, briefly, the temperature of a thermal radiating source is measured in a very high temperature range, such as in excess of 450 degrees centigrade, by transmitting its temperature dependent infrared radiation to a position where the temperature is lower, within a temperature range that can be monitored by existing optical temperature sensors and conventional optical fibers. An absorber of the infrared radiation is positioned at this location, and a conventional optical temperature sensor is positioned in thermal contact therewith in a manner to measure the temperature of the absorber in a known way by communication of visible or near-visible light through conventional fiberoptics to a remotely located instrument. The temperature sensing material may in some instances be combined with the infrared absorber in a manner to heat the sensor directly.

The light transmitted from the instrument to the optical temperature sensor and the temperature encoded light signal from the sensor to the instrument can be communicated in an efficient manner over conventional optical fibers utilizing wavelengths which fall within a portion of the spectrum to which the optical fibers are highly transmissive. The wavelength should thus be chosen to be in the visible or near visible range. This then allows the optical fibers to operate over very long distances.

Additional objects, advantages and features of the present invention will become apparent from the following description of its preferred embodiments, which descriptions should be taken in conjunction with the accompanying drawings.

BRIEF DESCRIPTION OF THE DRAWINGS

FIG. 1 schematically illustrates the basic operation of the present invention utilizing an infrared radiation emitter and an optical temperature sensor;

FIG. 2 shows emission curves of a blackbody source at different temperatures;

FIG. 3 illustrates a specific embodiment of the temperature sensing technique described with respect to FIGS. 1 and 2;

FIGS. 4A and 4B illustrate variations in the blackbody sensor of the embodiment of FIG. 3;

FIG. 5 illustrates another specific embodiment of the technique described with respect to FIGS. 1 and 2;

FIG. 6 shows yet another specific embodiment of the technique described with respect to FIGS. 1 and 2; and FIG. 7 illustrates use of the present invention to measure the temperature of a surface that is itself an infrared radiation emitter.

DESCRIPTION OF THE PREFERRED EMBODIMENTS

Referring initially to FIG. 1, a blackbody temperature sensor 11 with a reflecting surface 13 is positioned within a very hot environment 15, such as a furnace. The techniques of the present invention, as generally illustrated in FIG. 1, are most useful at temperatures in excess of 400 degrees centigrade, where conventional fiberoptic sensors cannot easily be used, and particularly above 450 degrees centigrade, where most such fiberoptic sensors are not practical. Infrared radiation indicated at 17 is emitted by the blackbody sensor 11. Changes in the spectral content of the infrared radiation 17 at different temperatures of the blackbody are shown by the several typical curves of FIG. 2.

Rather than directly detecting the temperature dependent characteristic of the infrared radiation 17, as is done in existing optical pyrometers and infrared radiometers, this radiation is first converted to heat by positioning in its path an infrared absorber 19. The infrared absorber 19 is located a distance from the very hot environment 15 so as to be heated substantially only by the infrared radiation from the blackbody sensor. It is desirable that the infrared absorber 19 not be heated through convection or conduction of heat from the environment 15. For example, if a transmission medium other than air is utilized between the sensor and the infrared absorber 19 to carry the infrared radiation 17, it should not conduct a significant amount of heat from the very hot environment 15 to the heat absorber 19. It may in fact be desirable to support the infrared absorber and optical temperature sensor at a distance from the end of the infrared transmitting medium, using a lens shaped tip on the latter in order to focus the infrared radiation efficiently on the sensor while avoiding direct conductive heating. By keeping the sensor physically isolated, heat conduction to or away from it is minimized. Under these circumstances, the temperature rise of the heat absorber 19 above ambient is proportional to the temperature of the sensor in a relationship that can be determined empirically and reproducibly for any particular arrangement and any particular ambient temperature.

If the temperature increase produced in the optical temperature sensor by the incident infrared radiation is a significant enough fraction of the temperature of the infrared emitting sensor, the rise will be large relative to ambient temperature and a correction for changes in ambient temperature may not be necessary. On the other hand, if the total rise is small, it may be necessary to correct for ambient temperature changes. This can be done in at least two ways: (1) a mechanical shutter can be introduced between the end of the infrared transmitting fiber and optical temperature sensor and the infrared-induced temperature rise can be determined by comparing the equilibrium optical sensor temperature when the shutter is open and when it is closed, thereby blocking the infrared radiation; or (2) a second sensor can be used but shielded from the infrared radiation to measure the ambient temperature at the sensor. By these techniques the infrared-induced temperature rise can be determined and correlated with the high temperature to be measured.

The physical arrangement of the elements is additionally chosen so that the heat absorber 19 is heated over a temperature within that which can be monitored by available optical temperature sensors and techniques, some of which have been previously described. Accordingly, the optical temperature sensing material or structure 21 is positioned immediately adjacent the heat absorber 19. A remotely located instrument 23 communicates with the optical temperature sensor 21 over a path 25. Light 27 is directed from the instrument 23 to the sensor 21, and temperature modified light 29 is then communicated back to the instrument 23. This light is then detected and its temperature-dependent characteristics are decoded in order to provide a measure of the temperature of the optical temperature sensor 21. Because of the fixed relationship between the measured temperature and that of the infrared emitting sensor 13, the instrument 23 can be calibrated to measure directly the temperature of the environment 15.

The optical temperature sensor is preferably made of a luminescent material and the optical path 25 is preferably a commercially available optical fiber or bundle of optical fibers. It may be desirable to support the optical temperature sensor at a distance from the conventional optical fiber in order to reduce conductive heating and thermal loading (heat sinking) of the sensor by the fiber so as to increase the responsiveness of the sensor. Various luminescent sensor materials for the sensor 21 and manner of exciting them and detecting the temperature dependent characteristics of the luminescent radiation 29 are described in detail in the several previously mentioned U.S. patents by Wickersheim and Samulski. A preferred technique and materials are given in U.S. Pat. No. 4,652,153 - Wickersheim et al. (1987), the disclosure of which is incorporated herein by reference. That patent describes in detail a preferred technique for alternately pulsing the luminescent sensor with exciting light and detecting the rate of decay of the luminescent intensity between excitation pulses.

Luminescent temperature sensors are preferred over other optical sensors for two reasons. First, they are readily separated from the fiber ends as discussed earlier to increase the responsiveness of the sensor. Second, since the input (exciting) and output luminescent) radiation are of different wavelengths, but are easily carried by the same fiber and separated at the instrument.

The infrared absorber 19 and adjacent fiberoptic sensor 21 are illustrated in FIG. 1 as separate layers held together in heat conductive relationship between them. The material for the infrared absorbing layer 19 may contain carbon black or may contain a mixture of transitional metal oxides with strong absorption bands in the near infrared. The sensor layer 21 is preferably made of particles of a phosphor material such as the ones described in the aforementioned Wickersheim et al. patent, suspended in a clear binder material. Alternatively, the absorbing and luminescent materials can be combined with a single binder and formed into a single structure. In some applications and with luminescent sensors in particular, the sensor 21 may by itself absorb enough infrared radiation 17 to raise its temperature over a dynamic range that is great enough for accurate measurement by the instrument 23. In any event, the mechanism of the technique illustrated in FIG. 1 is for the infrared emission 17 of the infrared-emitting sensor to be used to heat a second optical temperature sensor 21, whose temperature is then optically measured by a known technique. The luminescent materials mentioned above are excited by either blue or ultraviolet radiation. Thus, if one of these is chosen for the sensor 21, it will not be excited by the infrared radiation 17 to emit the detected luminescence 29. It is only the heating effect of the infrared radiation 17 that is measured by the luminescent sensor 21, which is independently excitable by visible or near visible radiation.

Referring to FIG. 3, a specific implementation of the techniques illustrated in FIG. 1 will now be described. Elements in FIG. 3 that are the equivalent to those previously described with respect to FIG. 1 are given the same reference character with a prime (') added. A near infrared transmitting rod or fiber 31 carries a blackbody sensor 11' at one end formed by coating the tip of the rod or fiber with a refractory absorptive or reflective layer. The material of the rod or fiber 31 is chosen to have a high degree of transparancy to infrared radiation, to withstand the very hot temperatures of the environment in which it is used, and to have a relatively low level of thermal conduction of heat away from that environment. Sapphire has been found to be a satisfactory material. At an opposite end of the rod or fiber 31 is attached an infrared absorber 19' and fiberoptic temperature sensor 21'. Alternately, there may be an ar space provided between the rod or fiber 31 and the absorber 19'. The sapphire rod or fiber 31 is much more efficient in transmitting near infrared radiation than are conventional optical fibers. The rod or fiber 31 is made long enough so that the infrared absorbing layer 19' is removed sufficiently from the very hot environment whose temperature is being measured by the blackbody sensor 11' so that the absorber 19' is caused to have its temperature raised by that environment primarily by the infrared radiation 17' emitted from the sensor 11'.

Referring now to the preferred type of fiberoptic sensor, a single optical fiber 33 of a conventional type communicates excitation radiation 27' and luminescent radiation 29' between the instrument 23' and the luminescent sensing layer 29'. In the system illustrated in FIG. 3, the diameter of the rod or fiber 31 may be greater than that of the conventional optical fiber 33. The luminescent sensor 21' is preferably made to be the same size as the cross-section of the rod or fiber 31. Excitation light then spreads from the fiber 33 out over the entire extent of the luminescent layer 21', and the luminescent radiation of the sensor 21' is gathered into the smaller optical fiber 33. This can be accomplished by the normal acceptance angle of the optical fiber 33, or, alternatively, for greater optical efficiency, a lens 35 may be positioned as to image the end of the optical fiber 33 on the end of the infrared transmitting rod.

Alternatively to the specific optical coupling shown in FIG. 3 between the luminescent layer 21' and the optical fiber 33, a bundle of optical fibers can be utilized in place of the single optical fiber 33 so that their collective cross-sectional area is similar to that of the sapphire rod or fiber 31. In that case, the phosphor material 21' can be attached directly to the ends of the optical fibers in the bundle, with the optical fibers being held fixed with respect to the rod or fiber 31. As yet another alternative, the rod or fiber 31 can be reduced in diameter to that of the conventional optical fiber 33, and the same mechanical attachment between them made. In any of these specific examples, the length of the expensive, hard-to-work-with sapphire rod or fiber 31 is minimized; that is, it is made only long enough to remove the sensor 21' far enough away from the hot environment 15 so as to not otherwise be affected by it. The infrared signal 17' is then converted by the absorber 19' and luminescent sensor 21' to a visible optical signal that can be carried by the lower cost, easier-to-work-with conventional fiber 33.

What is accomplished by the system of FIG. 3, then, is the scaling of the temperature variations of the environment 15 to within a much lower range of conventional optical fiber temperature measurement sensors. This scaling is accomplished by heating an absorber 19' above its ambient temperature by an amount that is proportional to that of the environment 15. The mechanism of this proportional heating is the use of infrared radiation emissions of a blackbody emitter which is positioned in thermal communication with the environment or object whose temperature is being measured. In effect, the absorber 19' and optical sensor 21' convert an optical temperature signal 17' in the infrared range to an optical signal 29' in the visible or near-visible range which can be carried by conventional optical fibers over long distances without unacceptable attenuation.

There are, of course, many variations in implementing the concept described which may be invoked either to increase the temperature rise of the optical temperature sensor, if desired, or to solve specific application problems such as to facilitate the measurement or control of the temperature of an infrared-emitting hot object which may be remotely located in a vacuum chamber. Some possibilities are described below.

For example, it may be desirable to increase the infrared radiation from the black body source which for now is presumed to have been formed at the tip of a sapphire rod. Neither sapphire nor the typically used metallic reflector have high emissivities in the near infrared. Thus, as shown in FIG. 4A, it may be desirable to first form a refractory, high emissivity film 41 around the tip of the fiber 31, after which a protective, reflective iridium layer 43 is applied.

Another variation of the sensor 11' of FIG. 3 is shown in FIG. 4B. An end 45 of a sapphire rod 31' is doped with absorbing transition metal ions to form a high or higher emissivity material by the process of diffusion. Reflective and protective layers 47 are then applied to form the blackbody sensor.

It may also be desirable to increase the amount of infrared radiation per unit area reaching the optical temperature sensor at the far end of the infrared transmitting rod. As shown in FIG. 5, this can be done by tapering the rod at an end 49 opposite the blackbody sensor to a smaller cross-sectional area at a tip to which an infrared absorbing layer 51 is then attached. An optical temperature sensor 53 is also attached to the small tip of the rod 49, over the layer 51.

In another embodiment, shown in FIG. 6, a tapered transparent rod 55 serves to concentrate the infrared signal and direct it more efficiently to a structure removed from its tip 57. That structure includes an infrared absorbing layer 59 held adjacent an optical sensing layer 61. An optical fiber 63, having an optional lens 65 on its end, is also separated from the sensor structure. The sensor is made to have low thermal mass and is held by a thin, rigid, support 67 having poor thermal conductivity.

It may also, for some applications, be desirable to remove the infrared-transmitting rod altogether to improve the transmission of infrared radiation from the source to the sensor. For example, a hollow tube might be used, as in the aforementioned patent by Ganguly et al., but with the optical temperature sensor at the end of the tube rather than using an infrared detector at the end of a conventional optical fiber.

This approach of omitting the rod can be further extended when it is desired to measure the temperature of an infrared-emitting solid in a vacuum chamber. In such a case, the optical temperature sensor is only heated by the infrared radiation rather than by convection or conduction of heat and can therefore by brought closer to the hot object in order to achieve an adequate temperature rise.

In many high temperature measuring applications, it is the surface of the infrared radiator itself whose temperature is desired to be measured. The same conversion techniques as described above can be used. An example is shown in FIG. 7 wherein the temperature of a surface 71 of an object 73 is measured by positioning a sensor in the path of its infrared radiation emissions 75 at a distance from the object where the ambient temperature is low enough for use of conventional optical techniques. The form of the sensor described with respect to FIG. 6 is advantageously employed.

Although the various aspects of the present invention have been described with respect to the preferred embodiments thereof, it will be understood that the invention is entitled to protection within the full scope of the appended claims.

It is claimed:

1. A method of measuring the temperature of an environment or object in excess of 450 degrees centigrade, comprising the steps of:

positioning in thermal communication with said environment or object a quantity of material that is characterized by emitting radiation in the infrared region of the electromagnetic spectrum with an energy level that is proportional to the temperature of said material, heating an optical temperature sensor by an amount proportional to a fraction of the temperature of said material by positioning said sensor in the path of said infrared radiation a distance from said environment or object, said optical temperature sensor being characterized by modifying incident optical radiation in the visible or near visible region of the electromagnetic spectrum by an amount that varies as a known function of its temperature, thereby to develop a visible or near visible optical signal proportional to the temperature of said sensor, directing said incident visible or near visible optical radiation toward said sensor, thereby to develop said temperature proportional optical signal, detecting said temperature proportional optical signal, and determining from said temperature proportional optical signal the temperature of said material, whereby the temperature of the environment or object is determined.

2. A method according to claim 1 wherein the step of positioning material in thermal communication with said environment or object includes the step of positioning said material at the end of a length of an infrared radiation guide that can withstand the temperatures of said environment or object, and wherein the step of heating the sensor includes the step of positioning said sensor in the path of said infrared radiation passing through said infrared radiation guide.

3. A method according to claim 2 wherein said infrared radiation guide is chosen to include an optical medium that is highly transparent to infrared radiation.

4. A method according to claim 2 wherein the step of positioning said sensor in the path of said infrared radiation includes the step of attaching said sensor at another end of the infrared radiation guide.

5. A method according to claim 2 wherein the step of positioning the sensor includes positioning said sensor a distance removed from another end of the infrared radiation guide.

6. A method of measuring the temperature of a surface of a heated object that emits radiation in the infrared region of the electromagnetic spectrum with an energy level that is proportional to the temperature of said surface, comprising the steps of:

heating an optical temperature sensor by an amount proportional to the temperature of said surface by positioning said sensor in the path of said infrared radiation a distance from said surface, said optical temperature sensor being characterized by modifying incident optical radiation in the visible or near visible region of the electromagnetic spectrum by an amount that varies as a known function of its temperature, thereby to develop a visible or near visible optical signal proportional to the temperature of said sensor, directing said incident visible or near visible optical radiation toward said sensor, thereby to develop said temperature proportional optical signal, detecting said temperature proportional optical signal, and determining from said temperature proportional optical signal the temperature of said surface.

7. A method according to ny of claims 1, 2 or 6 wherein the step of heating the sensor includes the steps of positioning an infrared absorbing layer so that the infrared radiation is incident upon one side thereof, thereby to be heated by the infrared radiation, and positioning adjacent said absorbing layer in thermal contact therewith on an opposite side thereof a layer of said optical sensor.

8. A method according to any of claims 1, 2 or 6 wherein the step of heating the sensor includes the step of positioning in the path of the infrared radiation an optical sensor that is further characterized by its said temperature proportional optical signal being substantially unaffected by said infrared radiation except through its heating effect.

9. A method according to either of claims 1 or 6 wherein the step of heating the sensor includes the step of positioning in the path of the infrared radiation a luminescent optical sensor, said luminescent sensor being characterized by emitting, when excited by said incident radiation in one wavelength range, said temperature proportional optical signal in another wavelength range.

10. A method according to either of claims 1 or 6 wherein the step of heating the sensor includes the step of positioning in the path of the infrared radiation a luminescent sensor, said luminescent material being characterized by emitting, when excited by said incident radiation in one wavelength range, said temperature proportional optical signal in another wavelength range, said luminescent material further being characterized by not being excited to luminescence by said infrared radiation.

11. A method according to either of claims 1 or 6 wherein the step of heating the sensor includes the step of positioning in the path of the infrared radiation a luminescent sensor, said luminescent material being characterized by emitting, when excited by transitory incident radiation in one wavelength range, a decaying luminescence function in another wavelength range that forms said temperature proportional optical signal, and further wherein the step of detecting said temperature proportional optical signal includes the step of detecting the rate of decay of the luminescence.

12. A method according to any of claims 1, 2 or 6 which comprises, after the heating step but before the detecting step, the additional step of communicating the temperature dependent optical signal from the sensor to a detecting station over an optical fiber communication medium, said detecting step taking place at said detecting station.

13. A method according to any of claims 1, 5 or 6 which comprises, after the heating step but before the detecting step, the additional step of communicating the temperature dependent optical signal from the sensor to a detecting station over an optical fiber communication medium that avoids contacting said sensor.

14. A method of measuring the temperature of an environment or object that is too hot for use directly therewith of an optical fiber communication medium and/or a luminescent temperature sensor of a type characterized by emitting, when excited, detectable electromagnetic radiation in the visible region of the spectrum that varies as a known function of the luminescent sensor temperature, comprising the steps of:
    positioning in said environment a blackbody element characterized by emitting radiation in the infrared region of the electromagnetic radiation spectrum with an energy that is proportional to the temperature of said material,
    providing an optical path of said infrared radiation energy to said luminescent temperature sensor in a manner to heat said sensor remotely from said environment, thereby to develop a visible optical signal proportional to the temperature of said blackbody element,
    providing a fiber optic path for the visible optical signal to a detector thereof, and
    determining the temperature of the blackbody element from the detected visible radiation.

* * * * *